(12) United States Patent
Moupfouma et al.

(10) Patent No.: US 10,829,243 B2
(45) Date of Patent: *Nov. 10, 2020

(54) LIGHTNING PROTECTION FOR AIRCRAFT ANTENNA AVIONICS

(71) Applicant: BOMBARDIER INC., Dorval (CA)

(72) Inventors: Fidele Moupfouma, Beaconsfield (CA); William Tse, Montreal (CA)

(73) Assignee: BOMBARDIER INC., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,349

(22) Filed: Mar. 14, 2019

(65) Prior Publication Data
US 2019/0210741 A1 Jul. 11, 2019

Related U.S. Application Data

(63) Continuation of application No. 15/128,616, filed as application No. PCT/IB2015/052162 on Mar. 24, 2015, now Pat. No. 10,279,926.
(Continued)

(51) Int. Cl.
*H01Q 1/28* (2006.01)
*B64D 45/02* (2006.01)
(Continued)

(52) U.S. Cl.
CPC ............... *B64D 45/02* (2013.01); *H01Q 1/28* (2013.01); *H01Q 1/50* (2013.01); *H01Q 1/52* (2013.01);
(Continued)

(58) Field of Classification Search
CPC .................................. H01Q 1/28; H01Q 1/52
See application file for complete search history.

(56) References Cited

U.S. PATENT DOCUMENTS

| 2,906,925 A | 9/1959 | Yonkers et al. |
| 5,456,442 A | 10/1995 | Sutton et al. |

(Continued)

FOREIGN PATENT DOCUMENTS

| CN | 2754278 Y | 1/2006 |
| CN | 2765314 Y | 3/2006 |

(Continued)

OTHER PUBLICATIONS

PCT international Search Report and Written Opinion dated Jul. 8, 2015 re: International Application No. PCT/IB2015/052162.
(Continued)

*Primary Examiner* — Graham P Smith
(74) *Attorney, Agent, or Firm* — Norton Rose Fulbright Canada LLP

(57) ABSTRACT

Assemblies, apparatus, devices and methods useful in providing lightning protection of avionic components associated with aircraft antennas are disclosed. Aspects of the present disclosure may be used on aircraft comprising structural elements made from composite materials having a relatively low electrical conductivity. An exemplary assembly disclosed comprises: an antenna secured to a structural element of the aircraft and configured to receive wireless signals and/or transmit wireless signals external to the aircraft; a communication unit operatively connected to the antenna for signal transmission between the antenna and the communication unit; and an isolation transformer electrically disposed between the antenna and the communication unit where signal transmission between the antenna and the communication unit is conducted via the isolation transformer.

7 Claims, 16 Drawing Sheets

Related U.S. Application Data

(60) Provisional application No. 61/971,847, filed on Mar. 28, 2014.

(51) Int. Cl.
  *H01Q 1/50* (2006.01)
  *H01Q 1/52* (2006.01)
  *H04L 25/02* (2006.01)
  *H01R 24/48* (2011.01)

(52) U.S. Cl.
  CPC .......... *H04L 25/0276* (2013.01); *H01R 24/48* (2013.01)

(56) References Cited

U.S. PATENT DOCUMENTS

| | | | |
|---|---|---|---|
| 5,745,081 | A | 4/1998 | Brown et al. |
| 8,378,903 | B2 | 2/2013 | Baucom et al. |
| 9,246,466 | B2 | 1/2016 | Guillot et al. |
| 2008/0191423 | A1* | 8/2008 | Cohen ............... B63B 35/793 277/316 |
| 2008/0204274 | A1* | 8/2008 | Peters ............... C23F 13/04 340/870.07 |
| 2009/0167465 | A1 | 7/2009 | Martch et al. |
| 2009/0167626 | A1 | 7/2009 | Martch et al. |
| 2009/0322147 | A1 | 12/2009 | Cooney |
| 2010/0297972 | A1* | 11/2010 | Van Den Elzen ....... H01Q 9/16 455/205 |
| 2011/0075311 | A1 | 3/2011 | Alkan |
| 2013/0033402 | A1 | 2/2013 | Meyer |

FOREIGN PATENT DOCUMENTS

| | | |
|---|---|---|
| FR | 2933378 A1 | 1/2010 |
| JP | S56102106 U | 8/1981 |
| WO | 2014005994 A1 | 1/2014 |

OTHER PUBLICATIONS

Pulse, A Technitrol Company, Understanding Common Mode Noise, G019.A (4/99), accessed online on Mar. 18, 2014.
High Pass Filter Protector, www.protectiongroup.com . . . ; accessed online on Mar. 21, 2014.
North Hills Signal Processing Corp., Wideband Transformers, Application Note #151, accessed online on Mar. 18, 2014.
English translation of Chinese Patent No. CN 2765314 dated Mar. 15, 2006, obtained from www.google.ca/patents/ . . . .
English translation of Chinese Patent No. CN 2754278 dated Jan. 25, 2006, obtained from www.google.ca/patents/ . . . .
The State Intellectual Property Office of the People's Republic of China, Notification of First Office Action dated Apr. 18, 2018 re: application No. 201580023059.5.
United States Patent and Trademark Office, Office Action dated Jun. 27, 2018 re: U.S. Appl. No. 15/128,616.
Norton Rose Fulbright Canada LLP, Response to Office Action dated Jun. 27, 2018 re: U.S. Appl. No. 15/128,616.
English translation of International Patent Application No. WO 2014/005994 dated Jan. 9, 2014, https://patents.google.com/patent/WO2014005994A1/en?oq=WO2014005994, accessed on Jun. 14, 2019.
European Patent Office, Communication pursuant to Article 94(3) EPC re: application No. 15714959.2 dated Jun. 3, 2019.
English translation of France patent document No. FR2933378 dated Jan. 8, 2010, https://patents.google.com/patent/FR2933378A1/en?oq=FR2933378a1, accessed on Aug. 1, 2019.
English translation of Japan patent document No. JP S56102106 dated Aug. 11, 1981, Machine Translated by EPO provided on Jun. 3, 2019.
Telkamp, TeTech Electronics, Advice, Design and Training, Use of ferrite cores in Boradband Baluns, Sep. 2011, pp. 1-40, HT Maarssen, www.tetech.nl/divers/balun.pdf.
English translation of Telkamp, TeTech Electronics, Advice, Design and Training, Use of ferrite cores in Boradband Baluns, Sep. 2011, pp. 1-40, Computer translation by EPO, accessed on May 21, 2019.

* cited by examiner

LIGHTNING PROTECTION FOR AIRCRAFT ANTENNA AVIONICS

CROSS-REFERENCE TO RELATED APPLICATIONS AND CLAIM OF PRIORITY

This application is a continuation of U.S. patent application Ser. No. 15/128,616 filed on Sep. 23, 2016, which is a national stage application under 35 U.S.C. 371 of International Patent Application No. PCT/IB2015/052162 filed on Mar. 24, 2015, which claims priority to U.S. Provisional Patent Application Ser. No. 61/971,847, filed on Mar. 28, 2014, the entire contents of which is incorporated herein by reference.

TECHNICAL FIELD

The disclosure relates generally to lightning protection of aircraft avionics, and more particularly to lightning protection of avionic components associated with aircraft antennas.

BACKGROUND OF THE ART

Aircraft can have a number antennas installed on their fuselage. For aircraft that have a metallic fuselage, the fuselage structure typically has a low electrical resistance so currents that may be induced by a lightning strike may propagate through the fuselage structure. However, the widespread use of composite materials in the construction of fuselages gives rise to special considerations relating to electrical conductivity and lightning protection because composite materials are typically less conductive than metals. For example, an antenna having a metallic and electrically conductive base secured to a fuselage structure made of composite materials could serve as a potential reattachment point for a lightning swept stroke. Consequently, cabling connected to such antennas could potentially become a path for lightning-induced electrical currents to penetrate the aircraft.

Improvement is therefore desirable.

SUMMARY

The present disclosure describes assemblies, apparatus, devices and methods useful in providing lightning protection of avionic components associated with aircraft antennas.

In one aspect, the disclosure describes an assembly for use on an aircraft. The assembly comprises:

an antenna secured to a structural element of the aircraft and configured to at least one of receive wireless signals and transmit wireless signals external to the aircraft;

a communication unit of the aircraft operatively connected to the antenna for signal transmission between the antenna and the communication unit; and an isolation transformer electrically disposed between the antenna and the communication unit where signal transmission between the antenna and the communication unit is conducted via the isolation transformer.

The isolation transformer may be physically disposed closer to the antenna than to the communication unit.

The isolation transformer may be directly connected to a connector of the antenna.

The aircraft structural element may comprise at least a portion of a fuselage of the aircraft.

The isolation transformer may be configured to permit the transmission of signals of frequencies between about 800 MHz to about 1.3 GHz.

The communication unit may comprise no other device intended to protect the communication unit from electrical current induced by a lightning strike.

The communication unit may be operatively connected to the antenna via an open circuit.

The isolation transformer may be disposed between the antenna and a coaxial cable.

The isolation transformer may comprise: a first winding connected between two terminals of the antenna; and a second winding connected between a core conductor of a coaxial cable and a shield of the coaxial cable connected to the communication unit.

The isolation transformer may comprise: a first winding connected between a line terminal of the antenna and a core conductor of a coaxial cable; and a second winding connected between a ground terminal of the antenna and a shield of the coaxial cable.

The aircraft structural element may comprise a composite material.

The communication unit may comprise lightning protection capabilities at a level sufficient for use within an aircraft having a metallic structural element.

In another aspect, the disclosure describes an apparatus for providing lightning protection for a communication unit of an aircraft connected to an antenna of the aircraft via a coaxial cable. The apparatus comprises an isolation transformer comprising a first winding inductively coupled to a second winding, the first winding being connected between two terminals of the aircraft antenna and the second winding being connected between a core conductor of the coaxial cable and a shield of the coaxial cable.

In another aspect, the disclosure describes an apparatus for providing lightning protection for a communication unit of an aircraft connected to an antenna of the aircraft via a coaxial cable. The apparatus comprises an isolation transformer comprising a first winding inductively coupled to a second winding, the first winding being connected between a line terminal of the aircraft antenna and a core conductor of a coaxial cable and the second winding being connected between a ground terminal of the aircraft antenna and a shield of the coaxial cable.

In another aspect, the disclosure describes a method for signal transmission between an antenna of an aircraft and a communication unit of the aircraft and for providing lightning protection for the communication unit. The method comprises:

at least one of:

generating, at the aircraft antenna, a signal representative of a wireless signal received at the antenna: and generating, at the communication unit, a signal representative of a wireless signal to be transmitted by the antenna; and inductively transferring the signal between the aircraft antenna and the communication unit.

The inductive transfer may be performed at a location closer to the antenna than to the communication unit.

The signal may comprise a frequency between about 800 MHz to about 1.3 GHz.

The method may comprise substantially preventing the transmission of direct current between the antenna and the communication unit.

In another aspect, the disclosure describes a method for signal transmission between an antenna of an aircraft and a communication unit of the aircraft and for providing lightning protection for the communication unit. The method comprises:

at least one of:
generating, at the aircraft antenna, a differential mode signal representative of a wireless signal received at the antenna; and
generating, at the communication unit, a differential mode signal representative of a wireless signal to be transmitted by the antenna;
permitting transfer of the differential mode signal between the aircraft antenna and the communication unit; and
attenuating a common mode signal between the aircraft antenna and the communication unit.

The differential mode signal may comprise a frequency between about 800 MHz to about 1.3 GHz.

The common mode signal may comprise direct current.

In a further aspect, the disclosure describes aircraft comprising the assemblies and/or apparatus disclosed herein.

In various embodiments, the isolation transformer may be physically disposed closer to the antenna than to the communication unit. For example, the isolation transformer may be directly connected to a connector of the antenna. In some embodiments the isolation transformer may be disposed between the antenna and a coaxial cable.

In various embodiments, the aircraft structural element to which the antenna may be secured may comprise at least a portion of a fuselage of the aircraft. In some embodiments the aircraft structural element may comprise composite material(s) having a relatively low electrical conductivity.

In various embodiments, the isolation transformer may be configured to permit the transmission of signals of frequencies between about 800 MHz to about 1.3 GHz.

In various embodiments, the communication unit may comprise no other device intended to protect the communication unit from electrical current(s) induced by a lightning strike. For example, the communication unit may comprise lightning protection capabilities at a level sufficient for use within an aircraft having a metallic structural element.

In various embodiments, the communication unit may be operatively connected to the antenna via an open circuit.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings. The present disclosure relates generally to lightning protection of aircraft avionics. In various aspects, the present disclosure describes assemblies, apparatus, devices and methods useful in providing lightning protection of avionic components associated with aircraft antennas. In some embodiments, the assemblies, apparatus, devices and methods disclosed herein may be used on aircraft comprising structural elements made from composite material(s) having a relatively low electrical conductivity. While the present disclosure is mainly directed to aircraft antenna assemblies, the assemblies, apparatus, devices and methods disclosed herein could be used on other types of mobile platforms (e.g., vehicles) and also in stationary applications where lightning protection associated with antennas may be desired.

Figure 1:
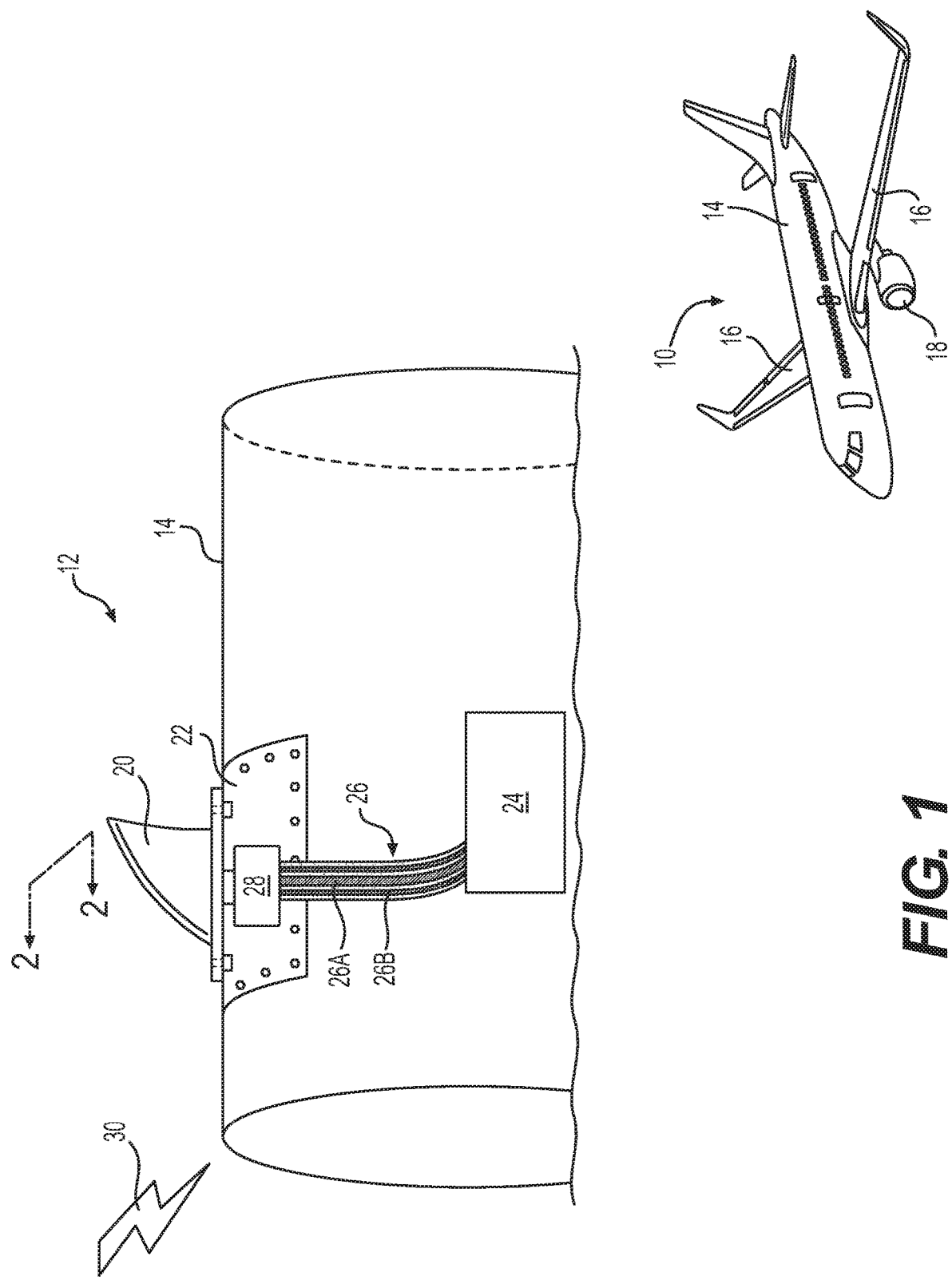
FIG. 1 shows an exemplary aircraft antenna assembly and a corresponding exemplary aircraft comprising the antenna assembly.

FIG. 1 shows an exemplary aircraft 10 and a partial schematic representation of antenna assembly 12, which may be part of aircraft 10. Aircraft 10 may comprise corporate, private, commercial or any other type of aircraft. For example, aircraft 10 may be a fixed-wing aircraft or rotary-wing aircraft. In some embodiments, aircraft 10 may be a narrow-body, twin engine jet airliner. Aircraft 10 may comprise fuselage 14, one or more wings 16 and one or more engines 18 for propelling aircraft 10. In various embodiments, aircraft 10 may comprise one or more structural components comprising one or more composite materials. For example, one or more of wings 16 and fuselage 14 may comprise composite material(s) such as suitable carbon fiber composite material(s) and/or other suitable composite materials. In some embodiments, such composite material(s) may have a relatively low electrical conductivity (e.g., electrically insulating) and electrical conductors may be embedded in such materials to provide some degree of protection against a lightning strike. Nevertheless antennas that are attached to aircraft structure comprising such composite materials via metallic bases may potentially serve as lightning re-attachment points. Accordingly, additional lightning protection for avionic components connected to such antennas may be desirable.

Antenna assembly 12 may comprise antenna 20, which may be secured to fuselage 14 via base 22. In various embodiments, antenna 20 could be secured to any suitable portion of aircraft 10 including wings 16 or other structural element(s) of aircraft 10. Base 22 may comprise a plate at least partially made from an electrically conductive (e.g., metallic) material. Antenna 20 may be configured to receive wireless signals and/or transmit wireless signals external to aircraft 10. For example, antenna 20 may be configured to transmit to a receiver external to aircraft 10 and/or receive wireless signals from a source external to aircraft 10. For example, antenna 20 may be used to communicate with a ground station. In some embodiments, antenna 20 may be suitable for high frequency (HF), very high frequency (VHF) and/or other types of communications. Alternatively or in addition, antenna 20 may be used for navigation purposes. In various embodiments, antenna 20 may be of the type suitable for one or more of air traffic control (ATC), distance measuring equipment (DME), traffic collision avoidance system (TCAS) and other applications related to civil aviation. Antenna 20 may be omnidirectional. In some embodiments, antenna 20 may be a suitable L-band antenna. In some embodiments, antenna 20 may be configured to operate at one or more frequencies within the range of a few hundreds of MHz to several GHz.

Assembly 12 may also comprise one or more communication units 24 (referred hereinafter as "communication unit 24") operatively connected to antenna 20 for signal transmission between antenna 20 and communication unit 24. Communication unit 24 may comprise any suitable avionic component(s) that may be used for interfacing with antenna 20. For example, communication unit 24 may comprise a (e.g., radio) receiver for receiving one or more signals representative of one or more wireless signals such as electromagnetic (e.g., radio) waves received at antenna 20. Alternatively or in addition, communication unit 24 may comprise a (e.g., radio) transmitter for generating one or more signals representative of one or more wireless signals to be transmitted (e.g., radiated) by antenna 20. Communication unit 24 may be disposed inside fuselage 14.

Antenna 20 may be connected to communication unit 24 via cable 26. Cable 26 may comprise a coaxial cable comprising core conductor 26A and shield 26B surrounding core conductor 26A. Assembly 12 may comprise one or more isolation transformers 28 (referred hereinafter as "isolation transformer 28") electrically disposed between antenna 20 and communication unit 24 where signal transmission between antenna 20 and communication unit 24 may be conducted via isolation transformer 28. In some embodiments, isolation transformer 28 may provide some degree of protection for communication unit 24 from lightning 30. In various embodiments and depending on the specific configuration of assembly 12, isolation transformer 28 may provide some protection for communication unit 24 from different phenomena associated with aircraft 10 being hit by lightning 30.

Figure 2:
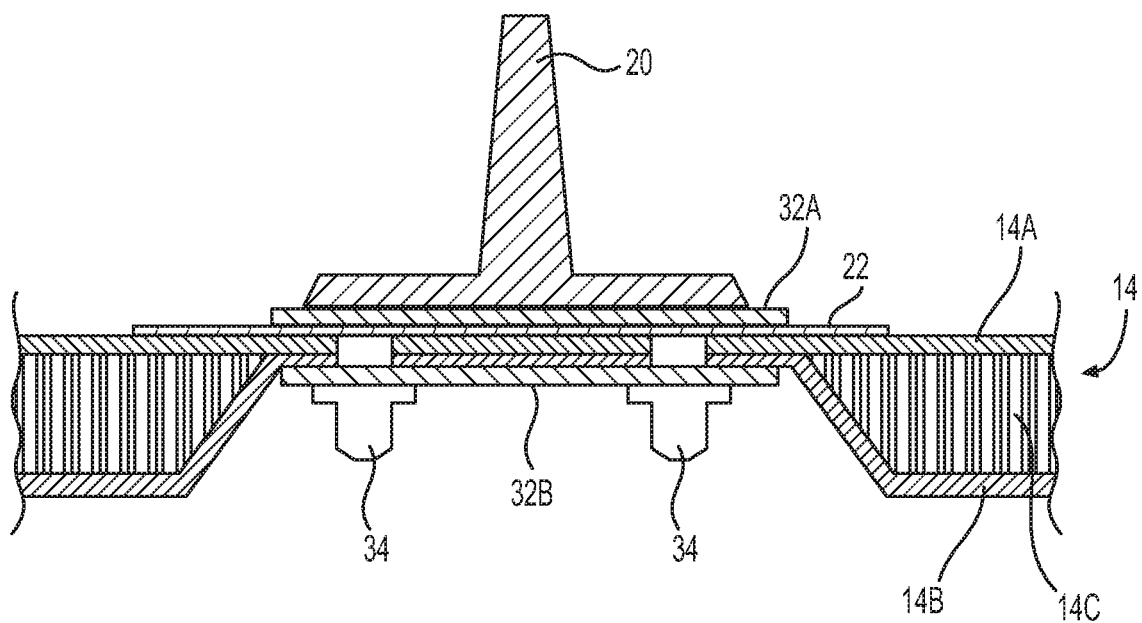
FIG. 2 is a cross-sectional view of an antenna of the assembly of FIG. 1 taken along line 2-2 in FIG. 1.

FIG. 2 is a cross-sectional view of an antenna of the assembly of FIG. 1 taken along line 2-2 in FIG. 1. Antenna 20 may be secured to fuselage 14 via one or more mounting plates 32A, 32B and nuts 34 in the region of base 22. One mounting plate 32A may be disposed on an exterior side of fuselage 14 and another opposing mounting plate 32B may be disposed on an interior side of fuselage 14. Fuselage 14 may comprise outer skin (e.g., layer) 14A and inner skin (e.g., layer) 14B. In some portions of fuselage 14, intermediate portion 14C between outer skin 14A and inner skin 14B may comprise suitable honeycomb or other type of structural element(s). In the region of antenna 20, intermediate portion 14C may be of reduced thickness or omitted altogether.

For some antenna installations, antenna bases may be metallic and the coaxial cables interconnecting such antennas to avionic and/or navigation systems inside the fuselage may have their connectors on the antenna side bonded to those bases. On a metallic aircraft, the fuselage structure can have a lower resistance than any antenna base and its connectors. However, for aircraft 10 comprising fuselage 14 made from composite material(s), the opposite may be true. As a consequence, any antenna base provided on a composite fuselage may be a potential lightning reattachment point that may potentially serve as path of relatively low impedance that facilitates the propagation of lightning-induced current through the coaxial cable and inside the aircraft. Such current may first propagate through the cable shield and then couple to core conductor via the mutual inductance between the shield and the core of the coaxial cable. During such occurrence, associated avionic and navigation systems may become susceptible to the induced voltage (e.g., electromagnetic noise).

With respect to a swept stroke, the current i(t) induced on the core of a coaxial cable terminated with its characteristic impedance Z, at both ends (in the antenna and in the avionic or navigation system) can be approximated by the following equation (1):

$$i(t) = \frac{I_o R_o}{2Z_o} l \frac{2}{\sqrt{\pi}} \sqrt{\frac{\tau_s}{t}} \sum_{n=1}^{\infty} \exp\left[-(2n-1)^2 \frac{\tau_s}{4t}\right] \qquad (1)$$

where $R_o$ is the cable's shield resistance to direct current, $l$ is the length of the cable's shield, $\tau$ is the shield current decay time constant and $\tau_s$ is the shield diffusion time. The value of $\tau_s$ may be smaller than or equal to the value of $\tau$.

Following a lightning strike on an aircraft comprising a composite fuselage, another phenomenon that can occur is that a relatively strong magnetic field may develop inside the composite fuselage for a relatively short time. Since the antenna on such aircraft structure and the avionics inside the aircraft may be grounded such that they are at the same potential, the interconnecting coaxial cable between the antenna and the associated avionics can produce a closed loop that could allow this magnetic field to generate magnetic flux in the circuit comprising the antenna, the coaxial cable and the avionic or navigation electronic system. Such varying magnetic flux can make the associated avionics susceptible to a common mode voltage.

Figure 3:
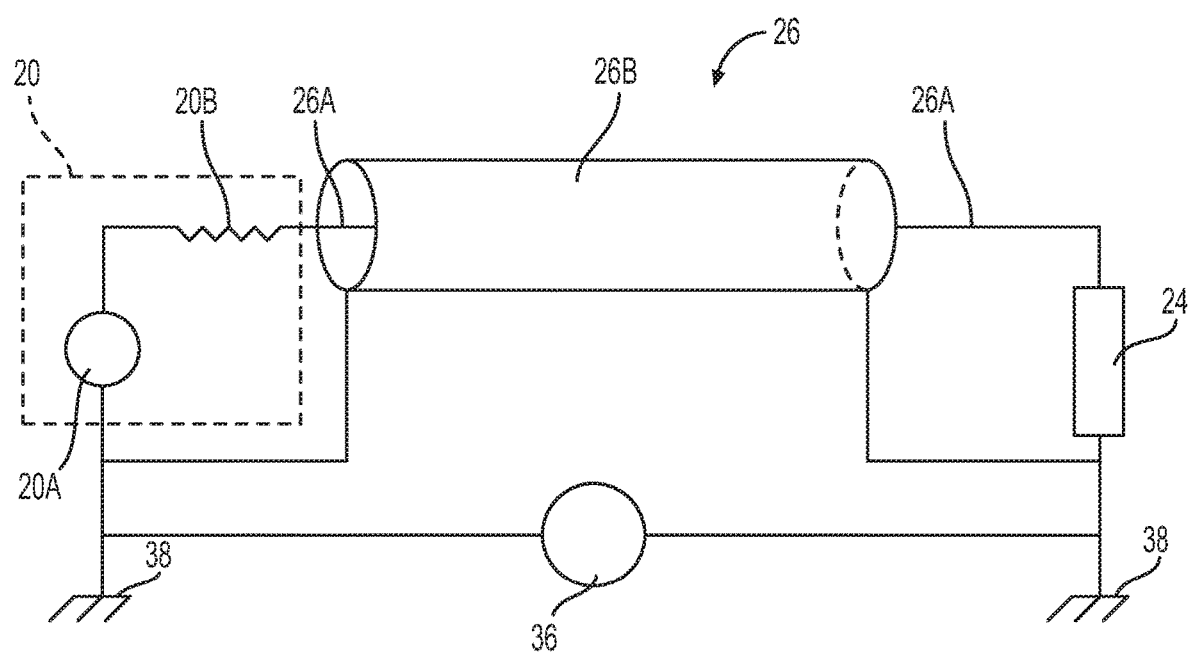
FIG. 3 is a schematic representation of a circuit of an antenna assembly without an isolation transformer.

FIG. 3 is a schematic representation of a circuit of an antenna assembly without isolation transformer 28. As explained above, a closed loop that could be formed between antenna 20 represented as voltage source 20A and impedance 20B, coaxial cable 26A, 26B and the avionic or navigation electronic system (e.g., communication unit 24). A common mode voltage may be represented as voltage source 36 between grounds 38.

Figure 4:
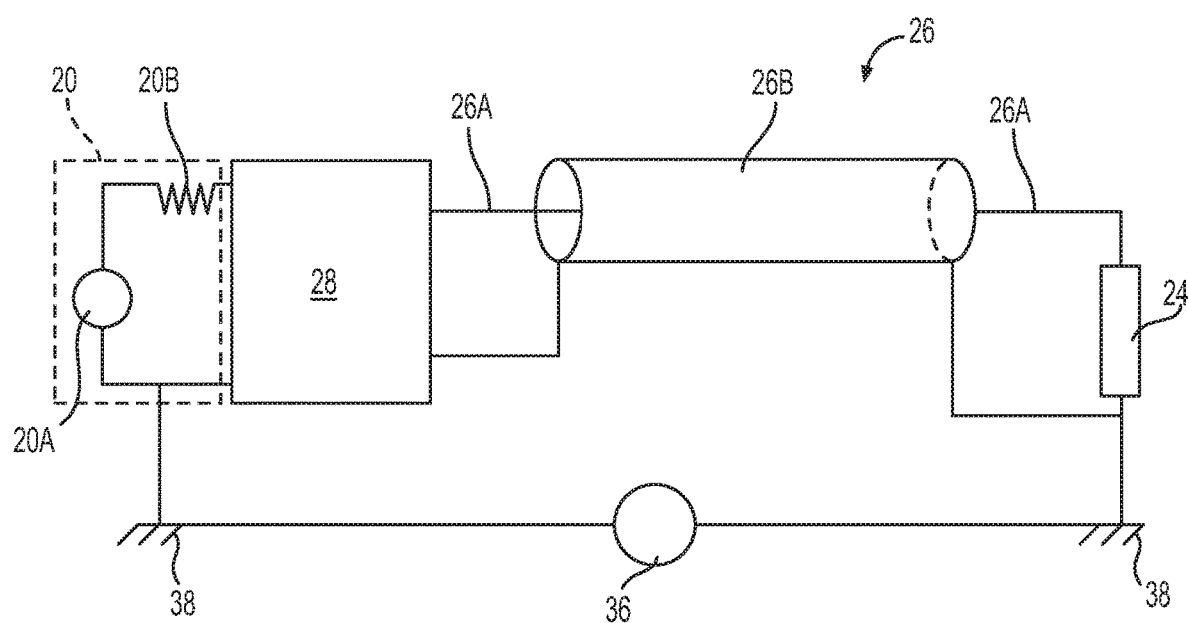
FIG. 4 is a schematic representation of a circuit of an antenna assembly with an isolation transformer.

FIG. 4 is a schematic representation of a circuit of the antenna assembly 12 of FIG. 1 comprising isolation transformer 28. In some embodiments, isolation transformer 28 may provide some protection with respect to a swept stroke which may favor high current propagation and reattachment on fuselage 14 where antenna 20 may be installed. Alternatively or in addition, in some embodiments, isolation transformer 28 may provide protection with respect to a relatively strong magnetic field that may develop for a relatively short time inside aircraft 10 due to the current from lightning 30 propagating through fuselage 14. Isolation transformer 28 may be electrically connected between antenna 20 and communication unit 24. Isolation transformer 28 may be physically disposed at any suitable location between antenna 20 and communication unit 24. For example, isolation transformer 28 may be physically disposed closer to antenna 20 than to communication unit 24. In some embodiments, isolation transformer 28 may be disposed between antenna 20 and coaxial cable 26.

Figure 5:
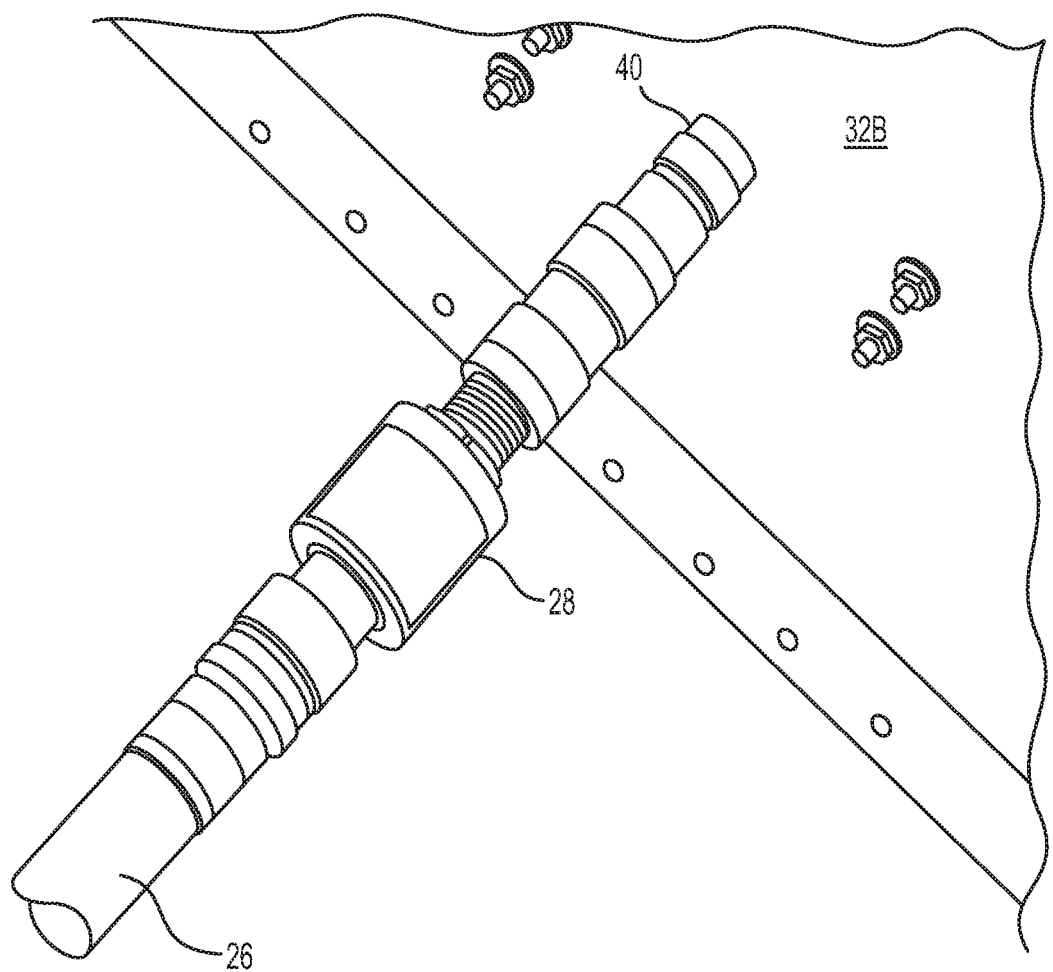
FIG. 5 is an image of an exemplary isolation transformer connected to a connector of the antenna of the antenna assembly of FIG. 1.

FIG. 5 is an image showing isolation transformer 28 being connected directly to connector 40 of antenna 20 of antenna assembly 12.

Figure 6:
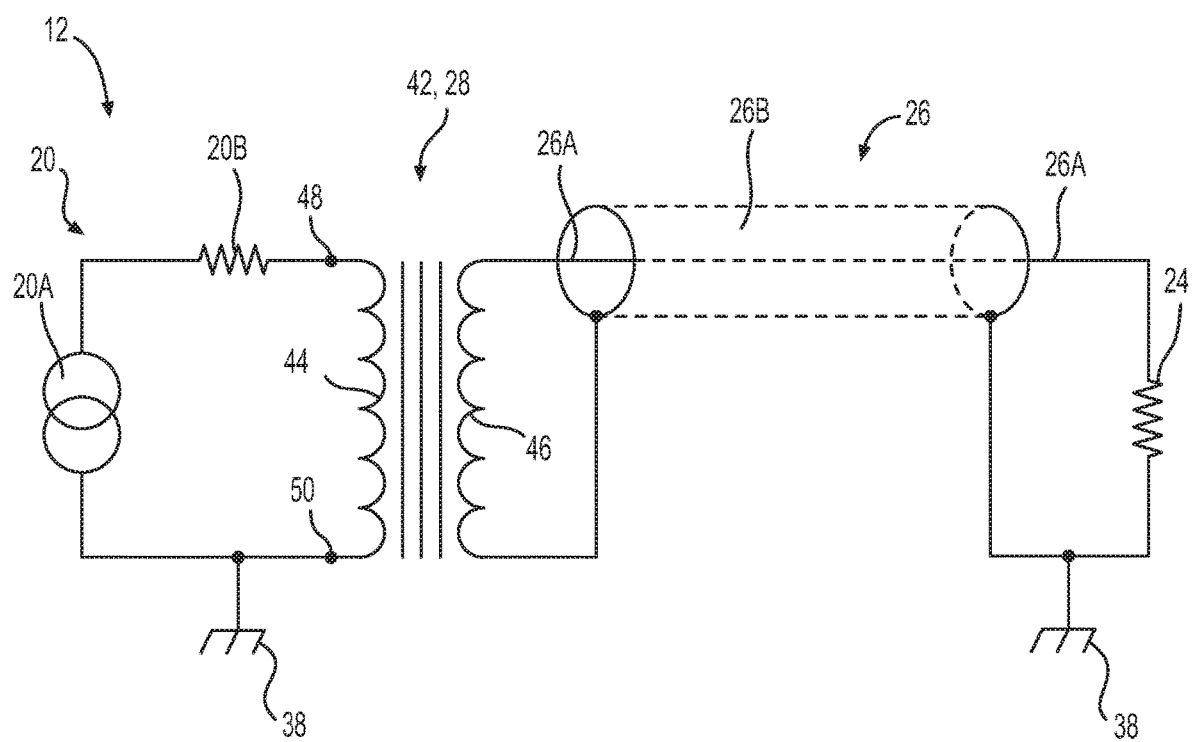
FIG. 6 is a schematic representation of the antenna assembly of FIG. 1 comprising an isolation transformer having a shunt configuration.

FIG. 6 is a schematic representation of antenna assembly 12 of FIG. 1 comprising isolation transformer 42, 28 having a shunt configuration. Isolation transformer 42, 28 may comprise first winding 44 and second winding 46. First winding 44 and second winding 46 may be inductively coupled to each other. First winding 44 may be connected between two terminals 48 and 50 of antenna 20. Terminal 48 may be a line terminal of antenna 20 and terminal 50 may be a ground terminal of antenna 20. Second winding 46 may be connected between core conductor 26A of coaxial cable 26 and shield 26B of coaxial cable 26, which may be connected to communication unit 24.

Isolation transformer 42, 28 may essentially sever the loop formed between antenna 20, coaxial cable 26, communication unit 24 and grounds 38 and substantially prevent direct current (DC) from flowing through coaxial cable 26. Accordingly, communication unit 24 may essentially be connected to antenna 20 via an open circuit. Since at least some of the current that could get induced in coaxial cable 26 due to a lightning strike may be DC in nature or have a relatively low frequency, isolation transformer 42, 28 may prevent some of such current(s) from flowing in coaxial cable 26. Also, since the useful signals that may be transmitted between antenna 20 and communication unit 24 may be alternating current (AC), isolation transformer 42, 28 may still permit the transfer of such signals. Isolation transformer 42, 28 may be designed according to known or other methods or selected to permit transmission of signals within a desired frequency range while substantially preventing transmission of signals that are below such frequency range. In various embodiments, isolation transformer 42, 28 may be configured to permit the transmission of signals having frequencies between about 800 MHz to about 1.3 GHz. In some embodiments, isolation transformer 42, 28 may function as a high-pass filter. In various embodiments, windings 44 and 46 may have a 1:1 turn ratio.

Figure 7:
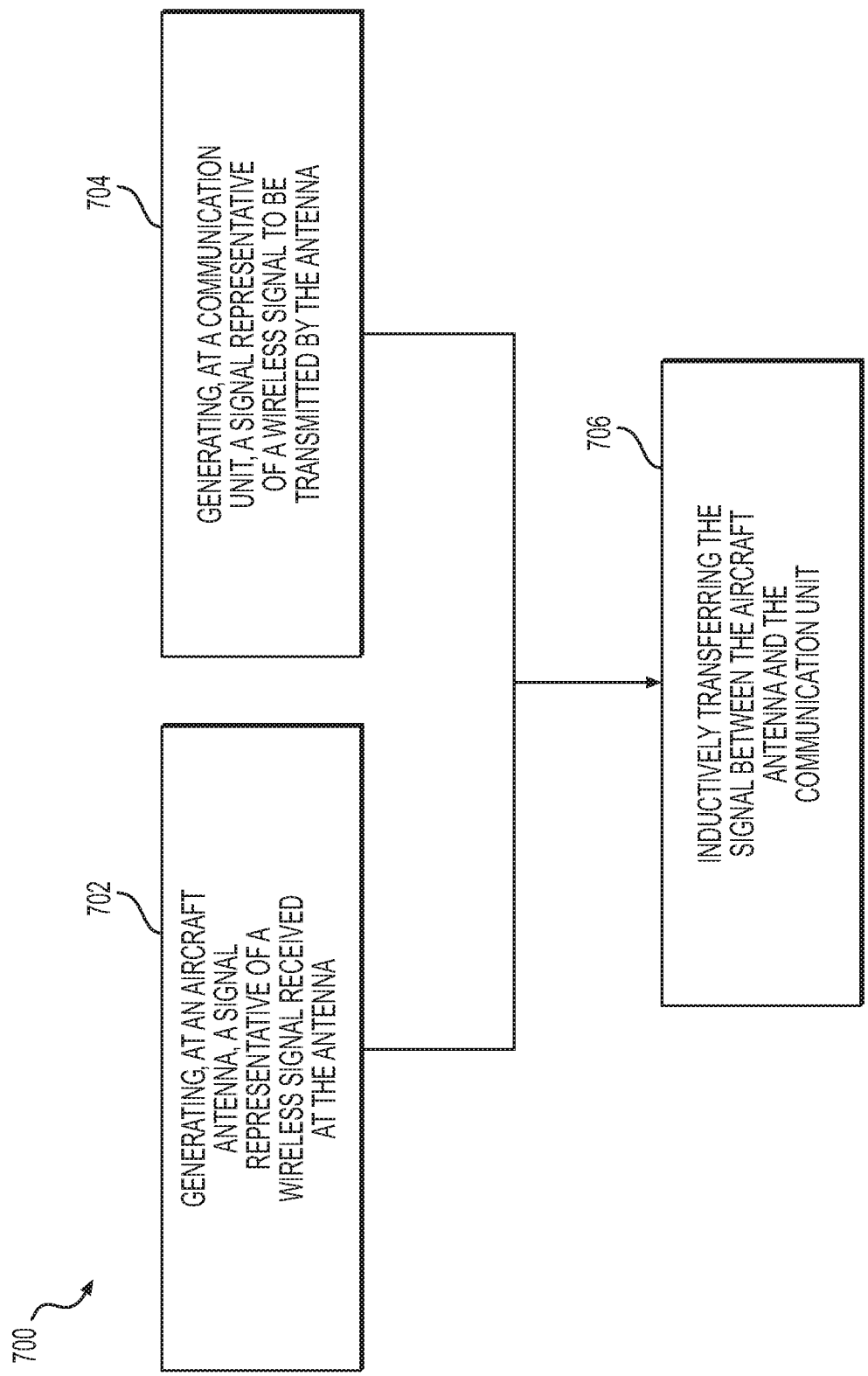
FIG. 7 is a flowchart illustrating an exemplary method for signal transmission between an antenna of an aircraft and a communication unit of the aircraft and for providing lightning protection for the communication unit using the isolation transformer of FIG. 6.

FIG. 7 is a flowchart illustrating an exemplary method 700 for signal transmission between antenna 20 of aircraft 10 and communication unit 24 of aircraft 10 and for providing lightning protection for communication unit 24. Method 700 may be conducted using isolation transformer 42, 28 of FIG. 6. Method 700 may comprise: at least one of: generating, at antenna 20, a signal representative of a wireless signal received at antenna 20 (see block 702): and generating, at communication unit 24, a signal representative of a wireless signal to be transmitted by antenna 20 (see block 704). Method 700 may also comprise inductively transferring the signal between antenna 20 and communication unit 24 (see block 706).

As shown in FIG. 6, isolation transformer 42, 28 may be physically disposed closer to antenna 20 than to communication unit 24 therefore the inductive signal transfer may be performed at a location closer to antenna 20 than to communication unit 24. The useful signal that is inductively transferred may be an alternating current. In some embodiments, the signal may comprise a frequency between about 800 MHz and about 1.3 GHz. Also, since isolation transformer 42, 28 may cause the connection between antenna 20 and communication unit 24 to be an open circuit, method 700 may also comprise substantially preventing the transmission of direct current between antenna 20 and communication unit 24.

Figure 8:
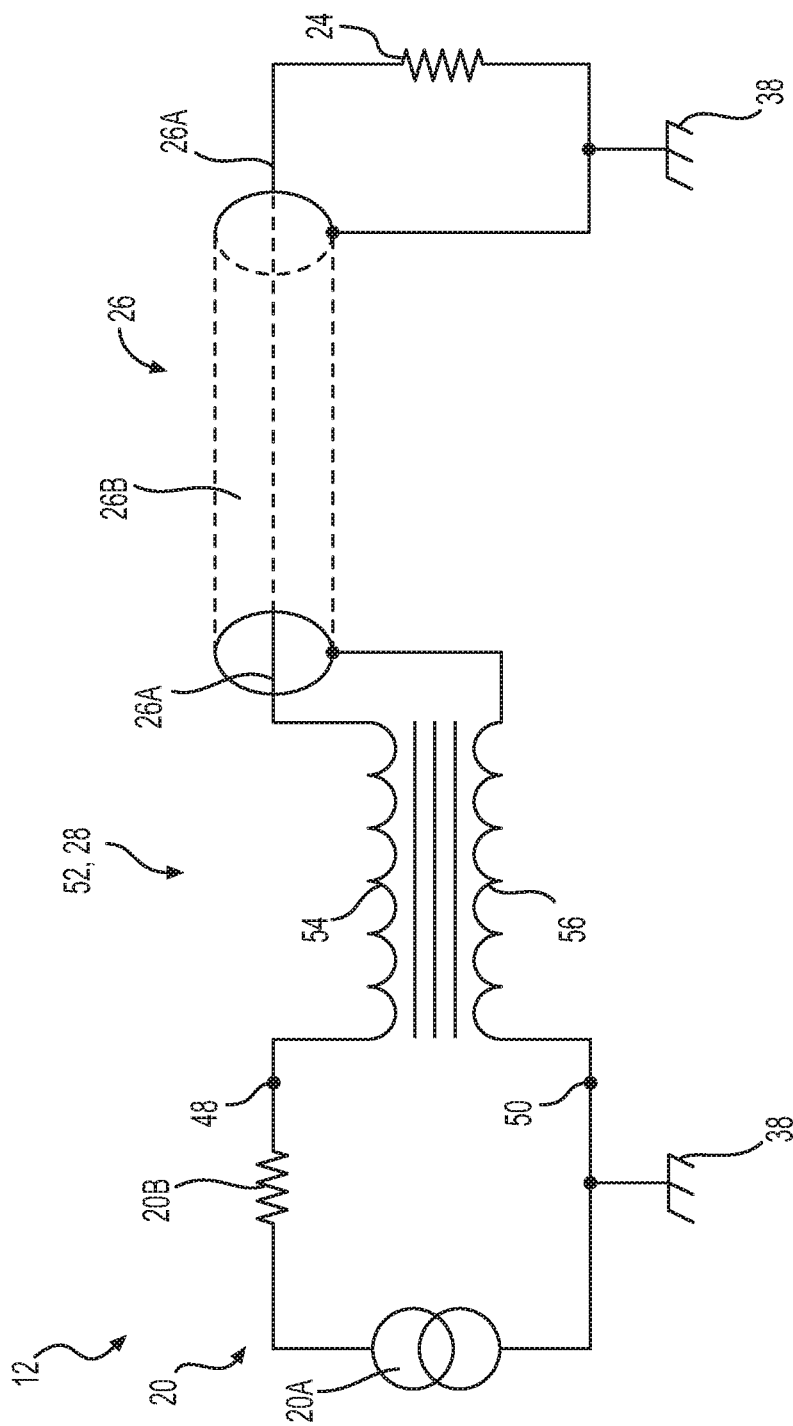
FIG. 8 is a schematic representation of the antenna assembly of FIG. 1 comprising an isolation transformer having a common mode choke configuration.

FIG. 8 is a schematic representation of the antenna assembly of FIG. 1 comprising isolation transformer 52, 28 configured as a common mode choke. Such configuration of isolation transformer 52, 28 may also be known as a "humbucking" configuration. Isolation transformer 52, 28 may comprise first winding 54 and second winding 56. First winding 54 and second winding 56 may be inductively coupled to each other. First winding 54 may be connected to line terminal 48 of antenna 20 and core conductor 26A of coaxial cable 26. Second winding 56 may be connected between ground terminal 50 of antenna 20 and shield 26B of coaxial cable 26. In other words, each of windings 54 and 56 may be connected in series with the signal circuitry provided by coaxial cable 26. Accordingly, isolation transformer 52, 28 may serve as a transmission line with suitable impedance. This configuration of isolation transformer 52, 28 may at least partly prevent (e.g., attenuate) some current(s) induced by common mode voltage(s) due to a lightning strike from flowing through coaxial cable 26. At the same time, isolation transformer 52, 28 may permit the transfer of useful differential signals generated at either antenna 20 or communication unit 24. Isolation transformer 52, 28 may permit the transfer of direct current.

Figure 9:
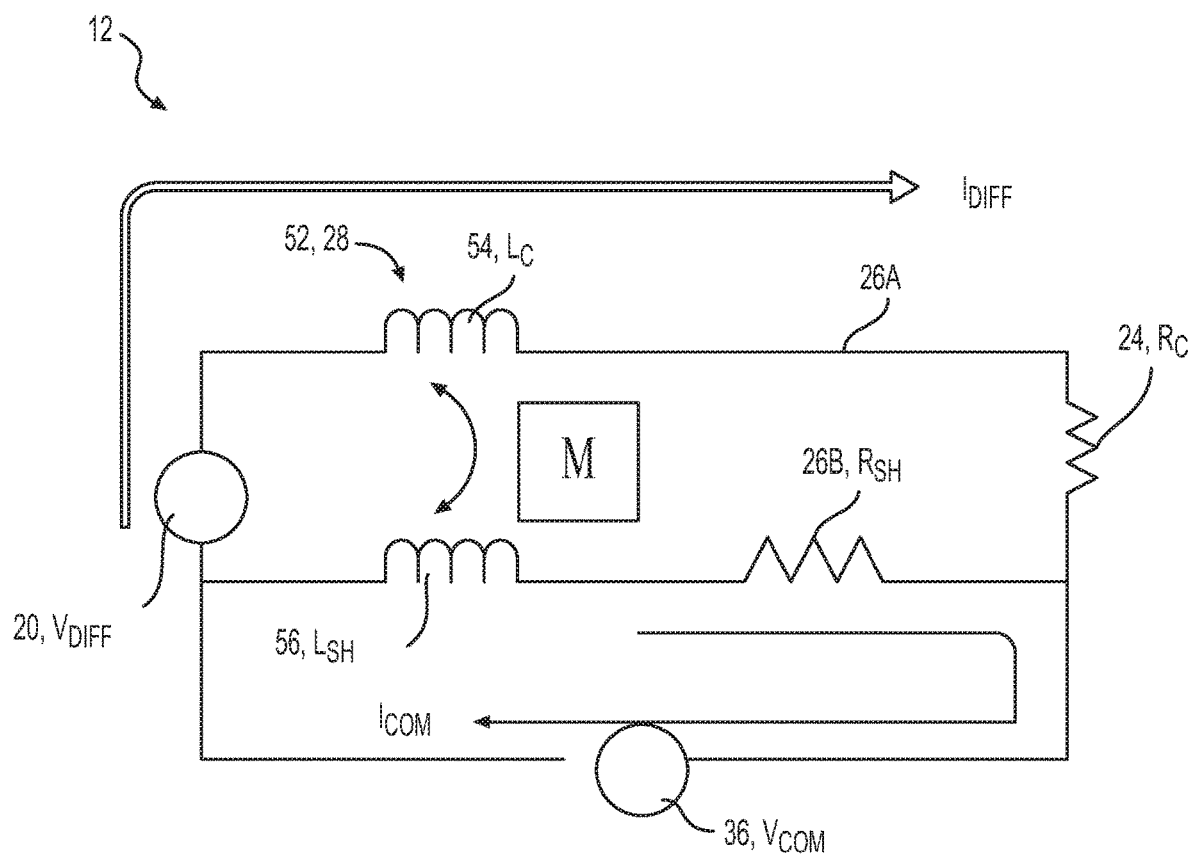
FIG. 9 is a schematic representation of a Kirchhoff circuit equivalent to the antenna assembly of FIG. 1 with the isolation transformer of FIG. 8.

FIG. 9 is a schematic representation of a Kirchhoff circuit equivalent to antenna assembly 12 comprising isolation transformer 52, 28. FIG. 9 also shows signal $I_{DIFF}$ generated at antenna 20 and transferred to communication unit 24 via winding 54 and core conductor 26A of coaxial cable 26 and returned to antenna 20 via winding 56 and shield 26B of coaxial cable 26. Accordingly, signal $I_{DIFF}$ may be considered a differential mode signal in the context of the circuit shown in FIG. 9. Signal $I_{COM}=I_{SH}$ (where $I_{SH}$ is the current developed in shield 26B due to lightning) may be a common mode signal that may be induced in the circuit of FIG. 9 when antenna 20 or another part of aircraft 10 may be hit by lightning 30. As explained below, isolation transformer 52, 28 may permit the transfer of signal $I_{DIFF}$ while attenuating $I_{COM}$ or substantially preventing the passage of $I_{COM}$ through windings 54 and 56.

The level of attenuation of common mode signal $I_{COM}$ provided by isolation transformer 52, 28 may depend on an inductance $L_C$ of core conductor 26A, and inductance $L_{SH}$ of cable shield 26B, and by the mutual inductance M between windings 54 and 56. In some embodiments, the inductances $L_C$ and $L_{SH}$ may each have a magnitude approximately equivalent to the mutual inductance M so that $L_C \approx L_{SH} \approx M$. Core conductor 26A may be connected to communication unit 24 and be characterized as having resistance $R_C$. Shield 26B may be characterized as having a resistance to direct current $R_{SH}$. In some embodiments, $R_{SH}$ may be significantly lower than $R_C$ so that $R_{SH} \ll R_C$. $V_{COM}$ may represent a common mode voltage generated by a magnetic field in the ground loop due to a lightning strike. $V_{COM}$ may induce signal (i.e., current) $I_{COM}$. $V_{DIFF}$ may represent a differential mode voltage generated at antenna 20 and may induce signal (i.e., current) $I_{DIFF}$. While FIG. 9 shows signal $I_{DIFF}$ being transmitted from antenna 20 to communication unit 24, it should be understood in light of the present disclosure that signal $I_{DIFF}$ could instead comprise a differential mode signal that is transmitted from communication unit 24 to antenna 20 for the purpose of transmitting a wireless signal via antenna 20. In various embodiments, windings 54 and 56 may have a 1:1 turn ratio.

Figure 10A:
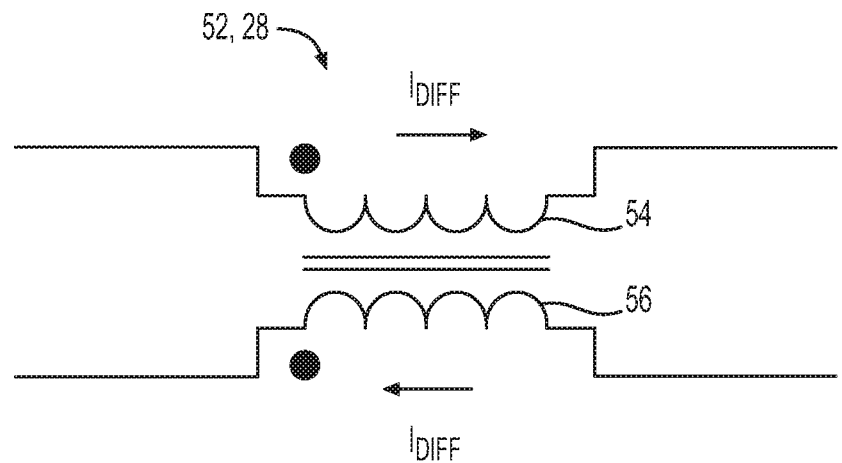
FIG. 10A is a schematic representation of the isolation transformer of FIG. 8 having a differential mode signal being transmitted via the isolation transformer.
Figure 10B:
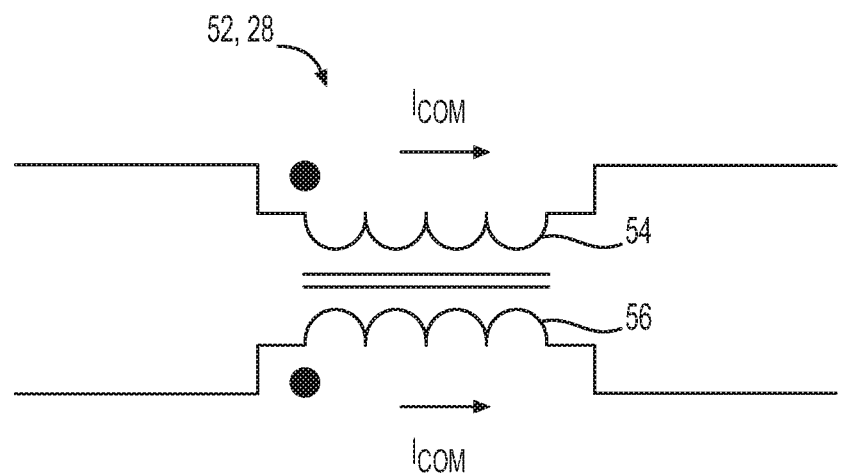
FIG. 10B is a schematic representation of the isolation transformer of FIG. 8 having a common mode signal being attenuated by the isolation transformer.

FIG. 10A is a schematic representation of isolation transformer 52, 28 having differential mode signal $I_{DIFF}$ being transmitted via isolation transformer 52, 28. FIG. 10B is a schematic representation of isolation transformer 52, 28 having common mode signal $I_{COM}$ being attenuated by isolation transformer 52, 28.

In reference to FIG. 10A, since the differential mode signal (i.e., current) $I_{DIFF}$ flows in opposite directions in windings 54 and 56, equal and opposite magnetic fields may be generated and may cancel each other out. This can result in isolation transformer 52, 28 presenting little to no impedance to differential mode signal $I_{DIFF}$ being transmitted through isolation transformer 52, 28. Accordingly, depending on the specific parameters of isolation transformer 52, 28, differential mode signal $I_{DIFF}$ may be transmitted via isolation transformer 52, 28 substantially unattenuated.

In reference to FIG. 10B, since common mode signal (i.e., current) $I_{COM}$ is induced to flow in the same direction in windings 54 and 56, equal and in-phase magnetic fields may be generated which may add together. This can result in presenting a high impedance to common mode signal $I_{COM}$ which may pass through isolation transformer 52, 28 heavily attenuated. The actual impedance presented by isolation transformer 52, 28 to common mode signal $I_{COM}$ may depend on the magnitudes of the impedance of isolation transformer 52, 28 and the impedance of one or more loads connected to isolation transformer 52, 28.

Analysis of the circuitry of FIG. 9 shows that signal $I_{DIFF}$ may be represented by the following equation (2):

$$I_{DIFF} = \frac{V_{DIFF}}{R_C} \quad (2)$$

The above equation shows that the presence of isolation transformer 52, 28 may not significantly affect the integrity of signal $I_{DIFF}$. Accordingly, when there is no lightning threat, the desired (i.e., useful) signal $I_{DIFF}$ may be transmitted between antenna 20 and communication unit 24 without significant distortion.

Common mode signal $I_{COM}$ may result in current $I_{SH}$ flowing in shield 26B of coaxial cable 26 and also current $I_C$ flowing in core conductor 26A of coaxial cable 26. The relationship between $I_{SH}$ and $I_C$ may be represented by the following equation (3):

$$I_{SH} = \frac{R_C}{R_{SH}} I_C \quad (3)$$

Accordingly, the common mode voltage $V_{COM}$ induced by the lightning strike may be governed by current $I_{SH}$ propagating in shield 26B of cable 26 and then current $I_C$ induced by the mutual inductance in core conductor 26A characterized by the inductance $L_C$. The propagation of current $I_C$ through communication unit 24 may generate electromagnetic noise voltage $V_N$ as represented by equation (4) below:

$$V_N = I_C R_C \quad (4)$$

$V_N$ could affect the immunity of communication unit 24 therefore the use of isolation transformer 52, 28 may help in reducing or cancelling that noise voltage $V_N$ at the functional frequencies of antenna 20.

Equations (5) to (9) below illustrate that for a cut-off frequency $\omega_c$ defined by equation (6) for any antenna frequency such as $\omega \gg \omega_c$, the noise voltage $V_N$ due to lightning will vanish and will not significantly affect the desired signal integrity of antenna 20.

$$\frac{V_{COM}}{V_N} = \left[1 + j\omega\left(\frac{1}{R_C} + \frac{1}{R_{SH}}\right)L_{SH}\right] \quad (5)$$

$$\text{For } \omega_c = \frac{R_{SH}}{L_{SH}} \quad (6)$$

$$V_N = \frac{V_{COM} R_{SH}}{L_{SH}(j\omega + \omega_c)} \quad (7)$$

$$I_{SH} \text{ for } \omega_c \ll \omega \quad (8)$$

provided $L_{SH}$ is chosen such as $\frac{R_{SH}}{\omega} \ll L_{SH}$ with $\omega$ being governed by lightning frequency $$V_N = \xrightarrow[\omega \to +\infty]{} 0 \quad (9)$$

Figure 11:
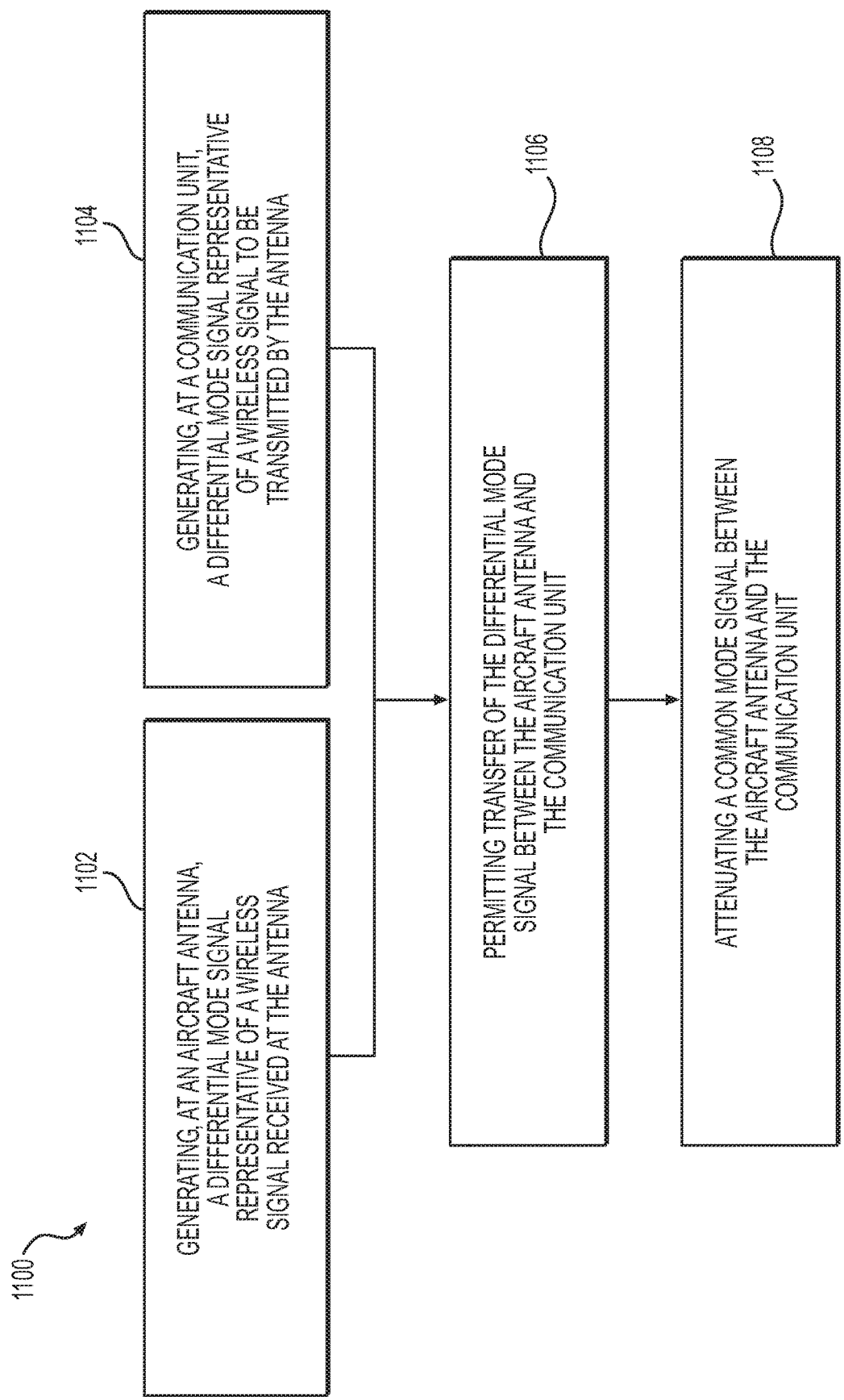
FIG. 11 is a flowchart illustrating an exemplary method for signal transmission between an antenna of an aircraft and a communication unit of the aircraft and for providing lightning protection for the communication unit using the isolation transformer of FIG. 8.

FIG. 11 is a flowchart illustrating an exemplary method 1100 for signal transmission between antenna 20 of aircraft 10 and communication unit 24 of aircraft 10 and for providing lightning protection for communication unit 24 using isolation transformer 52, 28. Method 1100 may comprise: at least one of: generating, at antenna 20, differential mode signal $I_{DIFF}$ representative of a wireless signal received at antenna 20 (see block 1102); and generating, at communication unit 24, differential mode signal $I_{DIFF}$ representative of a wireless signal to be transmitted by antenna 20 (see block 1104). Method 1100 may also comprise permitting transfer of differential mode signal $I_{DIFF}$ between aircraft antenna 20 and communication unit 24 (see block 1106); and attenuating common mode signal $I_{COM}$ between aircraft antenna 20 and communication unit 24 (see block 1108).

In some embodiments, differential mode signal $I_{DIFF}$ may comprise a frequency between about 800 MHz to about 1.3 GHz and common mode signal $I_{COM}$ may comprise direct current.

For some applications, the use one or more isolation transformers 42, 52, 28 disclosed herein may provide adequate lightning protection for communication unit 24 and no other devices or means of lightning protection may be required for communication unit 24. Accordingly, in some applications communication unit 24 may be of the same type as those used in conventional metallic aircraft and the use of one or more isolation transformers 42, 52, 28 may permit the use of such types of communication units on aircraft 10 comprising composite material(s). In other words, when communication unit 24 is used in conjunction with one or more isolation transformers 42, 52, 28, the level of lightning protection provided by isolation transformer(s) 42, 52, 28 may be sufficient and communication unit 24 may comprise no other special device(s) (e.g., lightning protection unit) intended for protecting communication unit 24 from electrical current induced by a lightning strike when communication unit 24 is used in aircraft 10 comprising a significant amount of composite material(s).

Example 1—Effect of the Isolation Transformer on the Desired Antenna Signal

The following experiments (Examples 1-3) have been conducted on antenna assembly as shown herein comprising a L-band aircraft antenna and a commercial filter functionally equivalent to an isolation transformer having a common mode choke configuration as disclosed herein. The commercial filter was a radio frequency (RF) filter model DSXL sold under the trade name POLYPHASER and configured to operate within the frequency band from 700 MHz to 2.7 GHz. The L-band antenna was installed on a composite barrel simulating a composite fuselage. An operational test was first conducted prior to lightning strike consideration from 800 MHz to 1.3 GHz at 20 dBm to make sure that the L-band antenna signal propagated through the whole frequency bandwidth (962-1220 MHz) without being significantly distorted by the filter.

Figure 12:
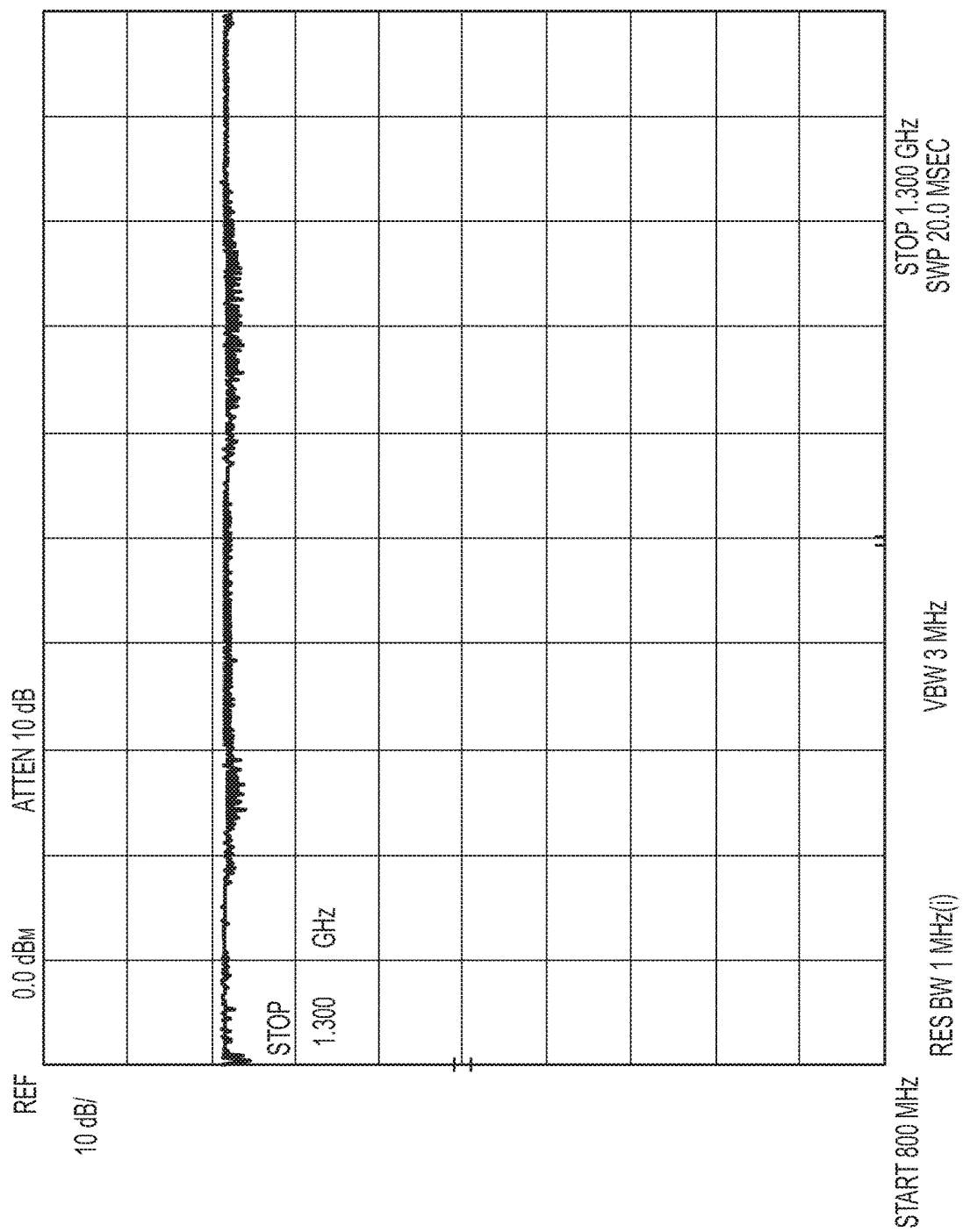
FIG. 12 is a plot illustrating antenna signal integrity over a frequency range during an exemplary operational test.

FIG. 12 is a plot illustrating antenna signal integrity in a frequency range during the exemplary operational test conducted.

Example 2—Effect of the Isolation Transformer on the Circuit Transfer Function

Using the same commercial filter as referenced in Example 1 above, experiments were conducted to evaluate the function of the isolation transfer under the influence of a lightning strike. Two main lightning current components have been chosen to simulate a lightning strike: Component A and Component H, both of which being recommended for indirect effects tests by the SAE Aerospace Recommended Practice (ARP) Number 5412 (referred hereinafter as "SAE ARP 5412") titled "Aircraft Lightning Environment and Related Test Waveforms" and incorporated herein in its entirety.

Figure 13:
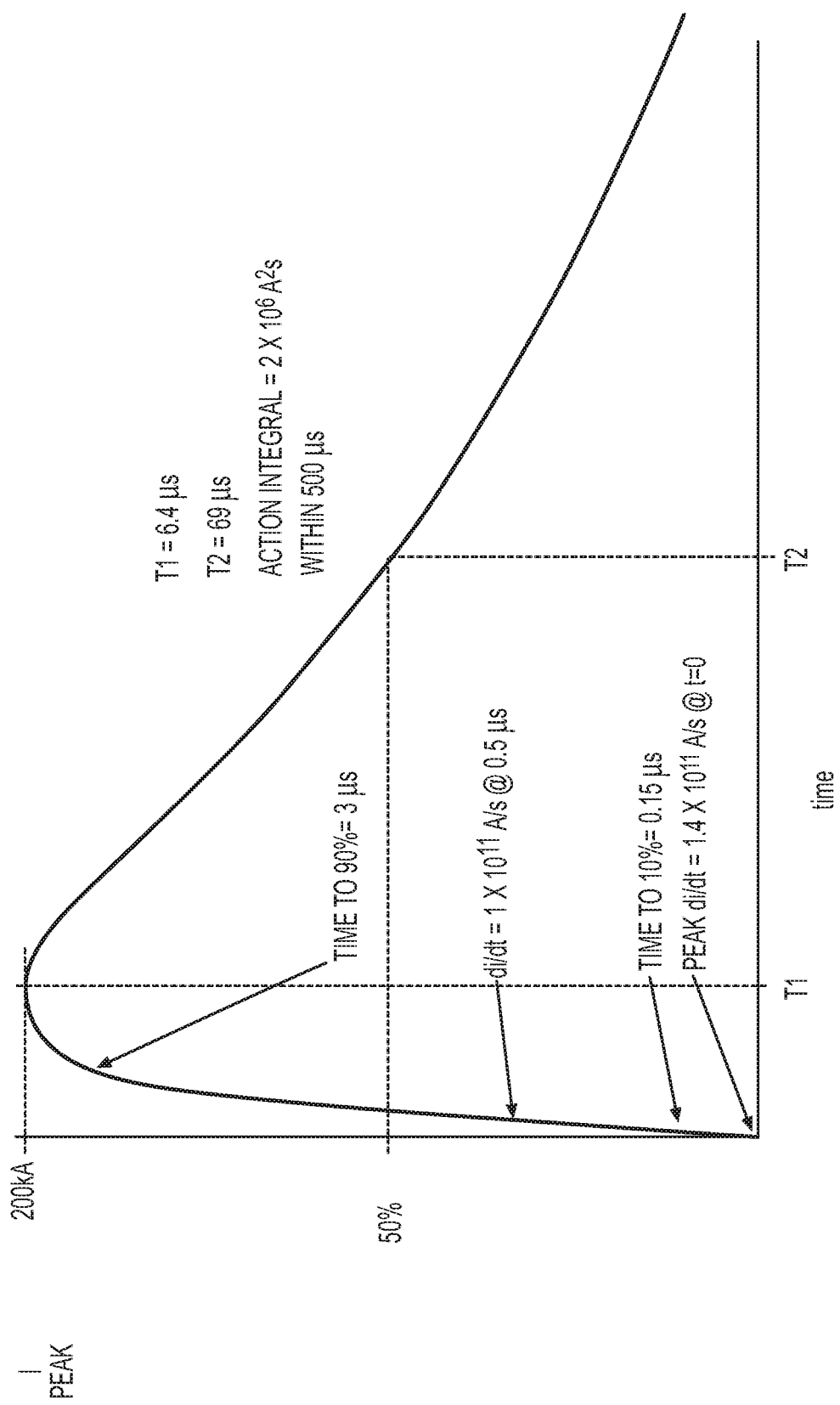
FIG. 13 shows a plot of an exemplary "Component A" electrical current test waveform derived from a lightning environment.

FIG. 13 shows a plot of a graphical representation of the Component A and represents the most common waveform that may be observed on an aircraft fuselage. Component A represents a first return stroke and combines the severe parameters of both the negative and positive first return strokes. Component H refers to the multiple burst waveform set. The multiple burst consist of 3 bursts of 20 pulses of component H waveforms. It represents a high rate-of-rise current pulse whose amplitude and time duration are much less than those of a return stroke. The highest amplitude tested was about 7.5 KA for Component A and about 3 KA for Component H.

Following a lightning strike, the lightning current on an aircraft structure may generate an induced current on the coaxial antenna cable inside the aircraft. That induced current will induce voltage at the avionic box (e.g., communication unit 24) load level by coupling through mutual inductance between the shield and the core cable. The ratio between that induced voltage and the current on the coaxial cable characterizes the transfer function.

Figure 14:
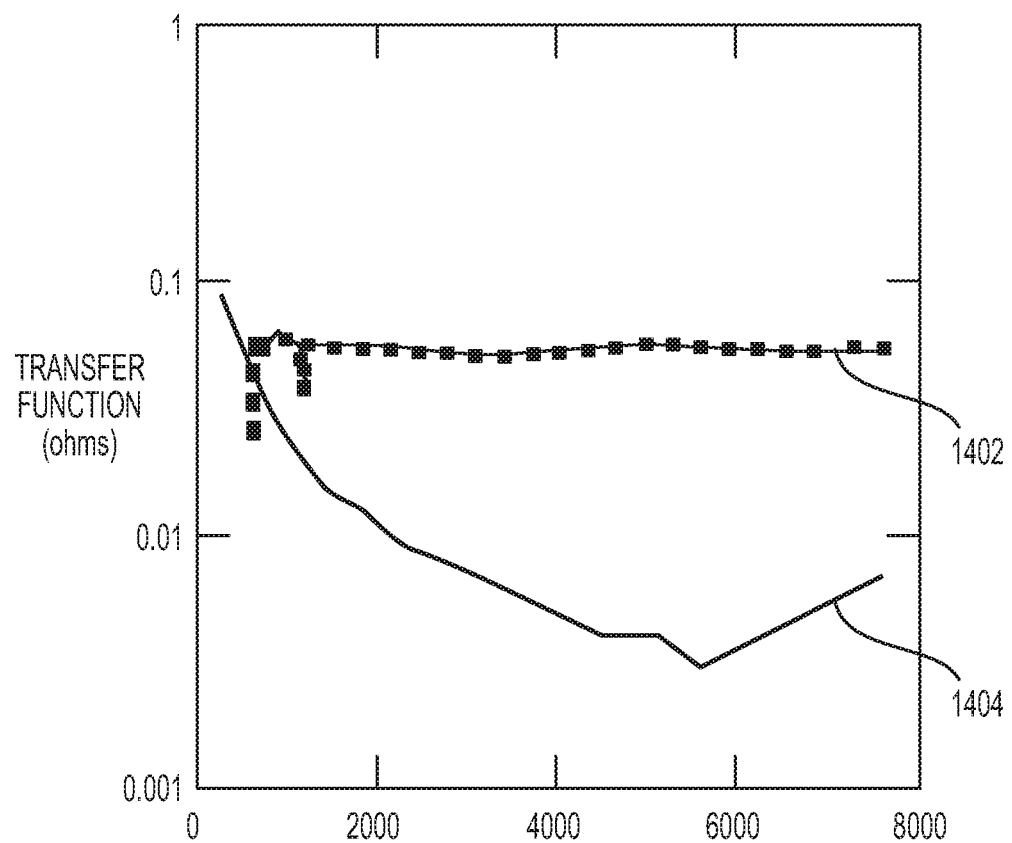
FIG. 14 is a plot comparing transfer functions of solutions without the use of an isolation transformer and with the use of an isolation transformer.

FIG. 14 is a plot comparing transfer functions of solutions without the use of the filter (see curve 1402) and with the use of the filter (see curve 1404). Different levels of injected current of Component A were used to obtain curve 1404. The solution with the filter as represented by curve 1404 was found to provide the lowest induced voltage and the highest protection (i.e., up to 20 dB) to the avionics system (e.g., communication unit 24) in a composite aircraft during a lightning strike.

Figure 15A:
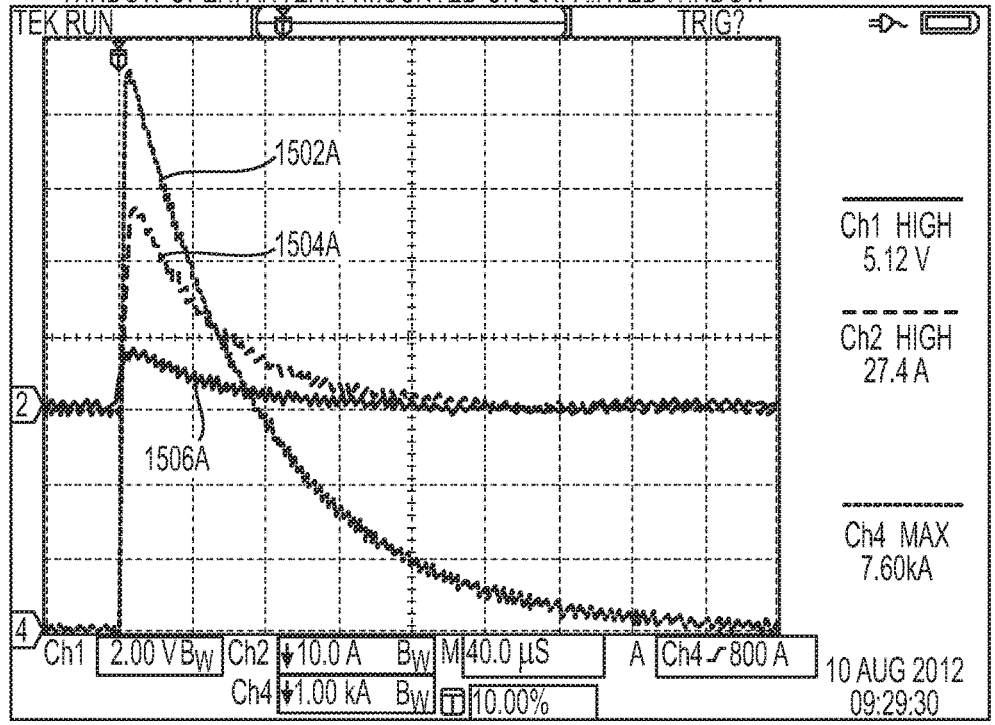
FIGS. 15A and 15B respectively show the induced voltage at the avionic system load level with and without the use of an isolation transformer when the aircraft structure is subjected to a Component A test lightning current.
Figure 15B:
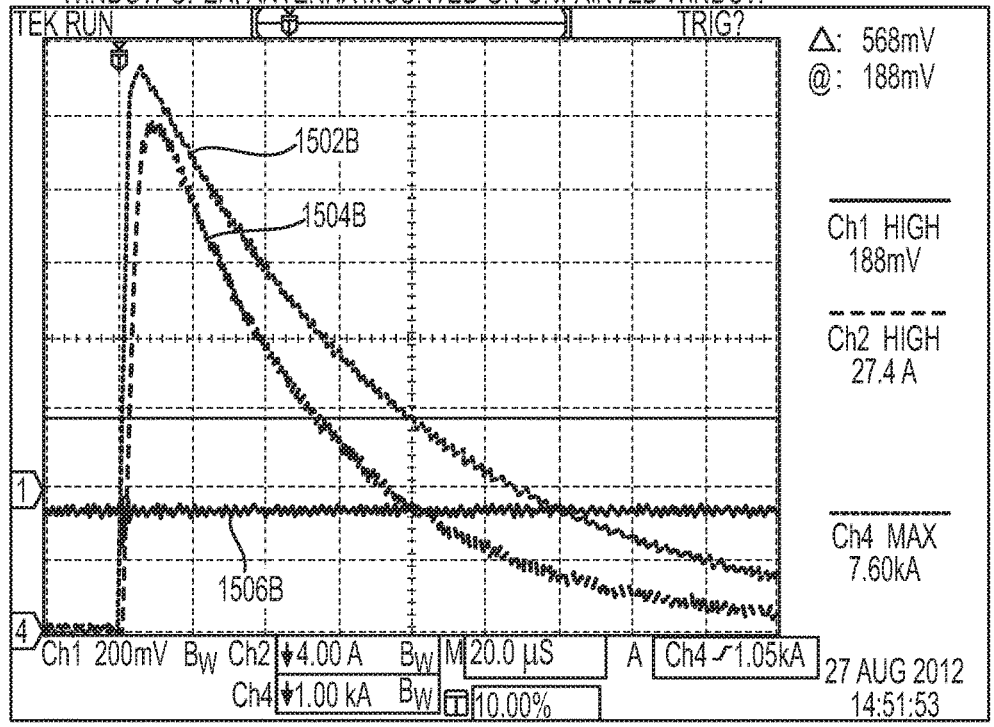

Example 3—Effect of the Isolation Transformer on the Avionics Systems Immunity in Lightning Environment FIGS. 15A and 15B respectively show the induced voltage at the avionic system (e.g., communication unit 24) load level with and without the use of the filter when the aircraft structure is subjected to a Component A test lightning current. In reference to FIG. 15A, the test done without the filter shows that using a test lightning current having a peak current of 7.46 KA (see curve 1502A) on the aircraft structure, a current of around 27.4 A was measured on the coaxial cable (see curve 1504A) and the lightning-induced voltage, which represents electromagnetic unwanted noise, at the associated avionic system load level was found to be 5.12 V (see curve 1506A). However, in reference to FIG. 15B, the test done with the filter shows that using the same test lightning current having a peak current of 7.46 KA (see curve 1502B) on the aircraft structure, the same current of around 27.4 A was again measured on the coaxial cable (see curve 1504B) and the lightning-induced voltage at the associated avionic system load level (i.e., on the core conductor of the coaxial cable) was found to be only 188 mV (see curve 1506A). FIGS. 15A and 15B show that, in this particular case, the filter provided an attenuation of 28 dB in response to a Component A test lightning current.

The current measurements were acquired using a current probe placed around the whole coaxial cable so the current values measured are those on the shield and on the core conductor. Therefore, the current of 27.4 A flowing on the shield was still measured when the filter was used but there was significantly less electromagnetic noise transmitted to the core conductor of the coaxial cable by mutual inductance between the shield and the core conductor. However, using an isolation transformer having a shunt configuration instead of the filter used in this experiment, the current induced on the shield of the coaxial cable due to lightning could be substantially eliminated due to the open circuit arrangement provided by such isolation transformer.

Figure 16A:
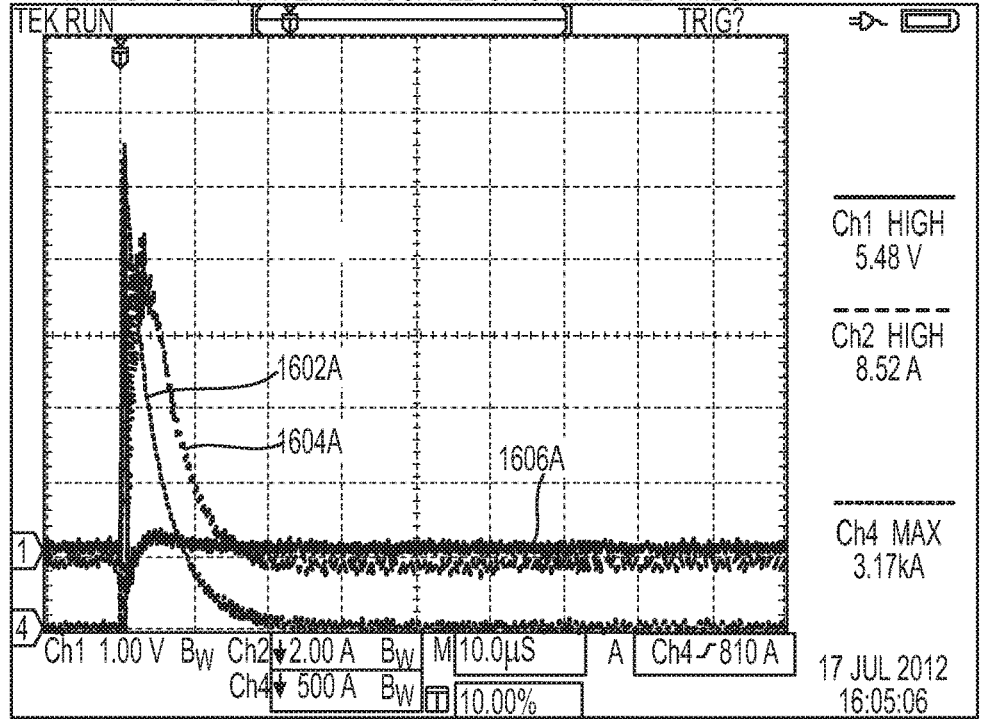
FIGS. 16A and 16B respectively show the induced voltage at the avionic system load level with and without the use of an isolation transformer when the aircraft structure is subjected to a Component H test lightning current.
Figure 16B:
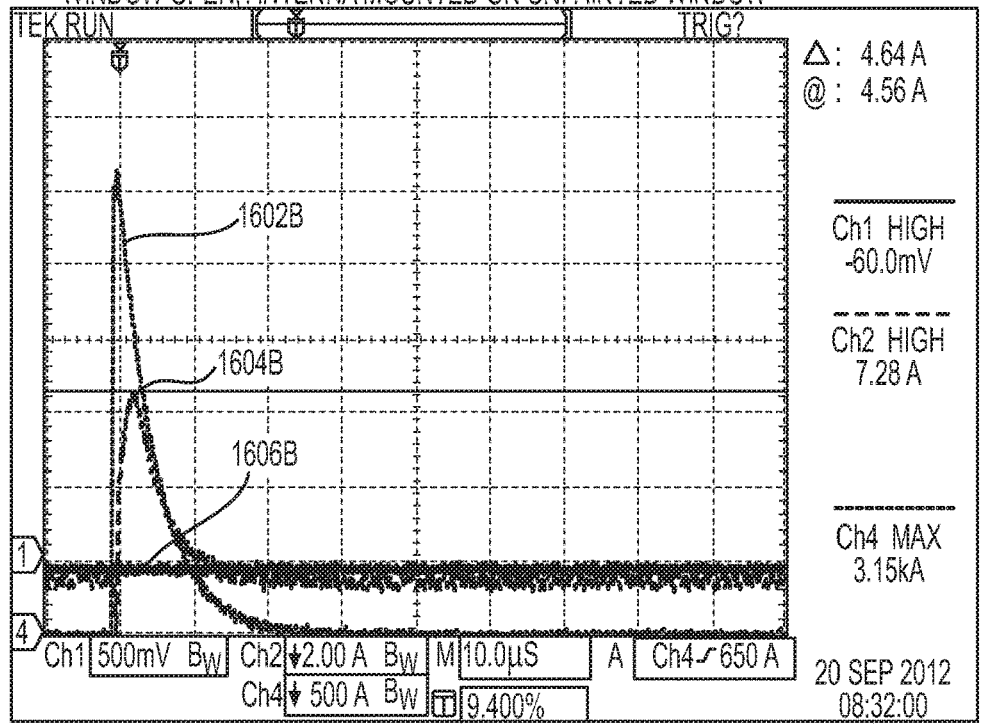

FIGS. 16A and 16B respectively show the induced voltage at the avionic system (e.g., communication unit 24) load level with and without the use of a filter when the aircraft structure is subjected to a Component H test lightning current. In reference to FIG. 16A, the test done without the filter shows that using a test lightning current having a peak current of 3.15 KA (see curve 1602A) on the aircraft structure (fuselage), a current of around 8.52 A was measured on the coaxial cable (see curve 1604A) and the lightning-induced voltage, which represents modulated electromagnetic unwanted noise, at the associated avionic system load level was found to be 5.48 V (see curve 1606A). However, in reference to FIG. 16B, the test done with the filter shows that using the same test lightning current having a peak current of 3.15 KA (see curve 1602B) on the aircraft structure, the same current of around 7.28 A was measured on the (shield of the) coaxial cable (see curve 1604B) and the lightning-induced voltage at the associated avionic system load level (i.e., on the core conductor of the coaxial cable) was found to be only 60 mV (see curve 1606B). FIGS. 16A and 16B show that, in this particular case, the filter provided an attenuation of 39 dB in response to a Component H test lightning current.

The above examples show that the use of an isolation transformer on an antenna assembly on an aircraft or other mobile platform comprising composite material(s) may provide some degree of protection from lightning-induced current(s) for a communication unit operatively connected to an antenna.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, assemblies and devices disclosed and shown herein may comprise a specific number of elements/components, the systems, assemblies and devices could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method for signal transmission between an antenna of an aircraft and a communication unit of the aircraft and for providing lightning protection for the communication unit, the aircraft comprising a fuselage, at least a portion of the fuselage comprising a composite material, the antenna being secured to the portion of the fuselage comprising the composite material via an electrically conductive metallic base, the method comprising:
   at least one of:
      generating, at the aircraft antenna, a signal representative of a wireless signal received at the antenna; and
      generating, at the communication unit, a signal representative of a wireless signal to be transmitted by the antenna; and
   inductively transferring the signal between the aircraft antenna and the communication unit.

2. The method as defined in claim 1, wherein the inductive transfer is performed at a location closer to the antenna than to the communication unit.

3. The method as defined in claim 1, wherein the signal comprises a frequency between about 800 MHz to about 1.3 GHz.

4. The method as defined in claim 1, comprising substantially preventing the transmission of direct current between the antenna and the communication unit.

5. A method for signal transmission between an antenna of an aircraft and a communication unit of the aircraft and for providing lightning protection for the communication unit, the aircraft comprising a fuselage, at least a portion of the fuselage comprising a composite material, the antenna being secured to the portion of the fuselage comprising the composite material via an electrically conductive metallic base, the method comprising:
   at least one of:
      generating, at the aircraft antenna, a differential mode signal representative of a wireless signal received at the antenna; and
      generating, at the communication unit, a differential mode signal representative of a wireless signal to be transmitted by the antenna;
   permitting transfer of the differential mode signal between the aircraft antenna and the communication unit; and
   attenuating a common mode signal between the aircraft antenna and the communication unit.

6. The method as defined in claim 5, wherein the differential mode signal comprises a frequency between about 800 MHz to about 1.3 GHz.

7. The method as defined in claim 5, wherein the common mode signal comprises direct current.

* * * * *